Dec. 29, 1959     O. R. ETHERIDGE     2,919,214
APPARATUS FOR PASTING OR COOKING STARCH
Filed Jan. 31, 1958     2 Sheets-Sheet 1
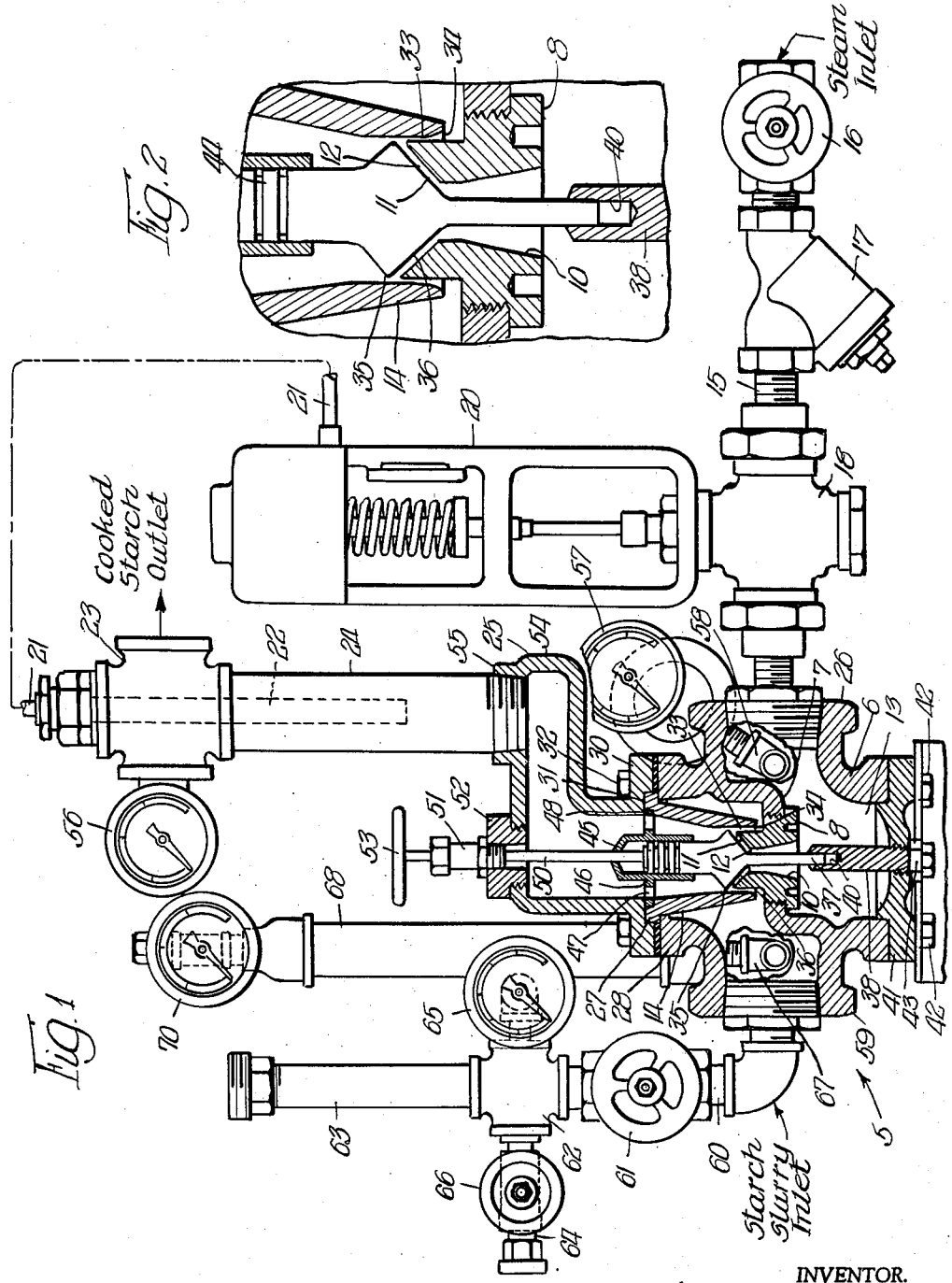
INVENTOR.
Oliver R. Etheridge,
BY
Cromwell, Greist & Warden
ATTYS.

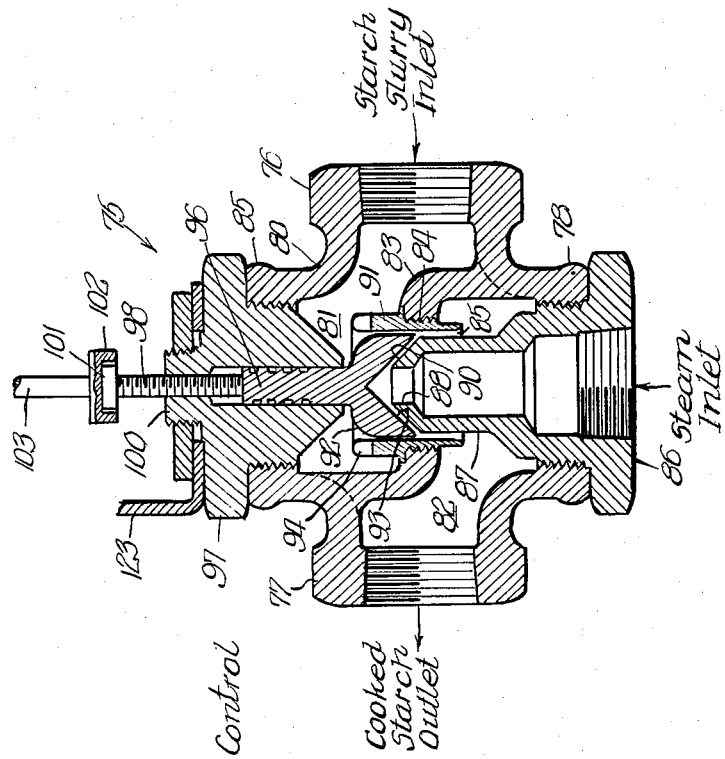

United States Patent Office 2,919,214
Patented Dec. 29, 1959

2,919,214

APPARATUS FOR PASTING OR COOKING STARCH

Oliver R. Etheridge, Decatur, Ill., assignor to A. E. Staley Manufacturing Company, Decatur, Ill., a corporation of Delaware Application January 31, 1958, Serial No. 712,535

9 Claims. (Cl. 127—28)

The present invention relates to innovations and improvements in devices sometimes referred to as jet cookers, for continuously pasting or cooking starch in an improved manner, and to automatically controlled installations thereof. This application is a continuation-in-part of my copending application Serial No. 412,219, filed February 24, 1954, now Patent No. 2,871,146.

In said co-pending application Serial No. 412,219, a complete system for handling and pasting starch is described including apparatus for preparing concentrated aqueous starch slurries, for continuously diluting such concentrated slurries, and for continuously pasting or cooking the diluted starch slurries. This application is particularly directed to the apparatus for carrying out the last operation, i.e. continuously pasting or cooking the starch slurries.

While the apparatus of this invention was developed particularly for use in the foregoing system, it is capable of independent use in continuously pasting starch slurries in a range of concentrations supplied from means other than those disclosed in said co-pending application Serial No. 412,219.

An important object of the invention is starch pasting or cooking apparatus which upon being applied with a stream of starch slurry and a source of steam operates continuously to paste or cook the starch substantially instantaneously, in a highly uniform, automatically controlled manner.

Another important object of the invention is apparatus for continuously pasting or cooking a stream of starch slurry wherein the slurry stream in the form of a thin annular or sleeve-like film is impacted from the interior by a high velocity jet of steam of generally conical shape whereby the heating of the starch slurry to the desired predetermined temperature is completely uniform and substantially instantaneous, with the result that the individual granules are all pasted or cooked to substantially the same predetermined degree.

Another important object of the invention is the provision of apparatus of the type described wherein the output temperature or discharge temperature of the pasted starch slurry is automatically controlled at a uniform or predetermined setting by means of thermostatic control which automatically regulates the size of the opening in the steam nozzle.

Another important object of the invention is the provision of apparatus of the type described wherein the output temperature or discharge temperature of the pasted starch slurry is automatically controlled at a uniform or predetermined setting by means of thermostatic control which automatically regulates the steam supply.

Another important object of the invention is a jet cooker for pasting or cooking a slurry of starch in the manner described which utilizes a body of the type used for standard globe valves and wherein the other components are either standard parts or easy to manufacture.

Still another important object of the invention is a jet cooker or paster which is easy to set and control, operates in a highly uniform manner, may be automatically regulated, is easy to inspect and service, and requires very little attention.

Certain other objects of the invention will, in part, be obvious and will in part appear hereinafter.

For a more complete understanding of the nature and scope of the invention reference may now be had to the following detailed description thereof taken in connection with the accompanying drawings, wherein:

Fig. 1 is an elevational view, partly in vertical section and partly broken away, showing a continuous starch cooker or paster with related control apparatus which constitutes one embodiment of this invention;

Fig. 2 is a fragmentary, detail view on enlarged scale showing the starch-steam blending nozzle on the interior of the continuous starch cooker and paster shown in Fig. 1;

Fig. 3 is a partly diagrammatic view showing an automatically controlled, continuous type, starch cooker or paster forming another embodiment of the invention; and Fig. 4 is an enlarged vertical sectional view taken through the jet cooker or paster forming a part of the system or installation shown in Fig. 3.

The continuous jet cookers of the present invention are of the type in which a thin, annular or sleeve-like stream of starch slurry is impacted from the interior by a thin, radially expanding jet of steam at high velocity, whereby the individual starch granules are controllably cooked or pasted to the desired degree in a very uniform manner and in a very short time (e.g. a fraction of a second). A continuous type cooker for, and method of, cooking starch in accordance with these principles, are shown and described in my Patent 2,805,966. The continuous jet cookers herein described constitute improvements over the cooker disclosed in said patent.

While the degree of pasting or heat modification of starch is, generally, proportional to time and temperature, the action of the continuous jet cookers of the present invention is so fast and of such short duration that the time factor may, for practical purposes, be considered a constant and disregarded, thus allowing effective process control on the basis of temperature regulation alone.

Referring to Figs. 1 and 2 of the drawings, the continuous jet cooker 5 comprises a cooker body 6 which may be the valve body of a commercial type globe valve. The partition wall or baffle 7 on the interior of the valve body 6 has a horizontal portion which normally carries an insert providing the valve port. In the cooker 5, the horizontal portion of the baffle or wall 7 is provided with an insert 8 which is screwed into place as shown and which is provided with a Venturi-shaped throat comprising a long tapered portion 10 and a short abrupt tapered portion 11. The tapered portions 10 and 11 join at a throat constriction which is designated at 12. The steam is introduced into the lower compartment 13 of the cooker body 6 and passes up through the Venturi opening in the insert 8 and out into the interior of a flow tube 14.

The flow tube 14 is supported from the top opening in the cooker body 6 by a laterally extending circumferential flange 27 which rests on the flat top surface of the circular mouth 28 of the cooker body 6. The top opening into the cooker body 6 is closed by a cooker outlet casting of fixture 25 having a circular flange 30 at the bottom which fits over the top of the mouth 28. On the interior the flange 30 is provided with a circular notch or recess 31 which receives the flange 27 of the nozzle member 14. The fitting 25 is retained in place on the cooker body 6 by means of a plurality of bolts 32—32 extending through the flange 30 and down into the mouth 28.

It will be seen that the interior of the nozzle member 14 is gradually flared outwardly from the bottom to the top with the bottom end thereof fitting around the insert 8 in spaced relationship thereto so as to define a narrow annular passageway indicated at 33. The bottom edge of the nozzle member 14 is tapered or cut away so as to provide a widened inlet 34 into the narrow passageway 33.

The opening 11 in the insert 8 is adjustably closed by means of a nozzle plug 35 having a tapered portion 36 which mates with the tapered throat portion 11 so as to provide the outwardly expanding, conical-shaped nozzle outlet opening 12. In Fig. 2 the taper of the conical opening 12 is 45° and in normal operation the jet of steam expanding therethrough creates a suction of about 2 lbs./sq. in. in the passage 33. If the taper of the jet opening 12 is increased to 90° (i.e. a flat disk) as in the case of the jet cooker shown in my Patent No. 2,805,966, there may be a back pressure in the passage 33 of about 10 lbs./sq. in.

The nozzle plug 35 has a depending support and centering pin portion 37 which projects downwardly through the insert 4 and into the upper end of a supporting post 38 having a smooth coaxial hole 40 formed in the upper end thereof in which the bottom end of the stem 37 is slidable.

The supporting post 37 is threaded on the bottom end and is screwed into a center opening provided on a closure cap 41 which is bolted over the lower opening into the cooker body 6 by means of a plurality of bolts 42—42. The post 38 has a hex head 43.

The upper end 44 (Fig. 2) of the nozzle plug 35 is in the form of a piston and projects coaxially into an inverted cup member 45 which is supported in place by means of an apertured flange or spider 46 provided with a series of ports 47. The outer edge of the flange 46 rests in a recess or groove 48 formed in the upper edge of the nozzle member 14 and is retained in place by means of an opposing portion of the bottom end 14 of the cooker outlet fixture 25.

The cup member 45 is provided with a central opening in the cover portion thereof through which projects a stem 50 projecting downwardly through a suitably packed thimble 51 which is screwed into the opening provided therefor in an adapter 52 screwed into the top of the outlet fixture 25. The stem 50 is coaxially aligned with the longitudinal axis of the nozzle plug 35 as well as with the longitudinal axis of the bottom support post 38. The upper end of the stem 50 is threaded where it passes through the thimble 51 and the projecting end of the stem 50 has a hand wheel 53 by which it may be turned so as to raise or lower the bottom end to the desired extent. It will be seen that the distance to which the nozzle plug member 35 is allowed to rise, and thereby the width of the nozzle outlet opening 12, is controlled by the setting of the bottom end of the stem 50.

The nozzle plug member 35 is, thus, slidably supported and guided at the bottom end by means of the post 38 and at the top by means of the inverted cup 45. It will be seen that when the steam pressure is turned on, the steam rises up through the interior of the insert 8 and forces the nozzle plug member 35 off from the seat 11, thereby opening up the nozzle outlet opening 12. The inverted cup 45 and piston 44 coact to give a dash pot action. The piston 44 may be provided with annular grooves which provide a larbyrinth-type seal which increases the dash pot effect.

The outlet fixture or connection 25 is provided with an integrally formed side arm portion 54 which has an internally threaded outlet connection 55 in the top into which is screwed the bottom end of the nipple 24 leading to the four-way fitting 23. The fitting 23 has a thermometer 56 connected to one side thereof so as to measure the temperature of the pasted starch slurry as it is discharged from the cooker.

If desired, the steam pressure on the inlet side of the cooker 6 may be measured by means of a pressure gauge 57 which is connected to the interior of the chamber 13 by means of an elbow member 58 screwed into an opening provided therefor in the rear side of the cooker body 6.

The steam is delivered from a steam line 15 which is provided with a check valve 16, a strainer 17, and a steam regulating valve 18 of known type which is thermostatically controlled by a thermostat 20 of known design. The thermostat unit 20 is actuated by an expendable fluid contained in a capillary tube 21, the thermostat bulb element 22 of which projects down through the cross fitting 23 connected with the upper end of a discharged nipple 24 leading from a discharge fitting 25 forming part of the jet cooker 5. The steam line 15 is connected to the jet cooker 5 at the port or connection 26.

Starch slurry to be pasted is delivered to the jet cooker 5 at the left hand port or connection 59 through a pipe connection 60 provided with a flow regulating valve 61 of known type. In one preferred arrangement the line or connection 60 leads from a cross fitting 62 the top port which is connected with a water line 63, the left hand port of which is connected with a concentrated starch slurry line 64, and the right hand port of which is provided with a pressure gauge 65 as described in my copending application Serial No. 412,219. The line 64 contains a flow regulating valve 66 of known type. The automatic flow control and proportioning apparatus described in my copending application Serial No. 412,219 may be used to deliver a stream of water through line 63 and a stream of concentrated starch through line 64 into the fitting 62 where the streams are blended and the resulting mixture flows through line 60 into the jet cooker 5. If desired, a starch slurry could be prepared in any other suitable method and at any desired concentration and supplied through the port connection 59 into the jet cooker.

If desired, the pressure of the starch slurry delivered to the port 59 may be used in regulating of the automatic blending apparatus described in copending application Serial No. 412,219. For this purpose the body of the jet cooker is provided with an opening on the rear side for receiving a pipe nipple 67. A vertical settling chamber 68 is screwed into the nipple 67 and is provided at the top with a pressure gauge 70.

The jet cooker described in connection with Figs. 1 and 2 may be operated in the following manner:

In starting up the jet cooker from the cold condition it is preferred to first run water through it until the parts are heated up and the device is operating smoothly. Accordingly, instead of introducing starch slurry through the connection 59, plain water is introduced with the thermostat unit being set so that the water discharged through the fitting 25 will have the desired discharge temperature. It will be understood that the steam valve 16 in the steam supply line 50 will be open and that the supply of steam will be under control of the thermostat 20.

After a minute or two of warm-up operation on water, starch slurry will be introduced into the port 59 at a uniform concentration and flow rate as described above. The setting of the stem 50 by means of the hand wheel 53 determines the quantity of steam admitted into the continuous cooker 5 for any particular steam pressure. This setting of the stem 50 will depend mainly upon the degree or extent to which it is desired to paste or cook the starch, greater amounts of steam being required to cook a larger quantity of starch slurry, or to cook the starch slurry to higher temperatures.

The starch slurry flowing through the port 59 will form into a thin annular or sleeve-like stream as it passes through the annular opening or passageway 33 leading into the nozzle member 14. The passageway 33 can vary in width depending upon the size of the jet cooker but a satisfactory width has been found to be in the neighborhood of 30 thousandths of an inch.

While starch slurry (initially water) is introduced into the upper compartment, steam flows into the lower compartment 13 of the cooker body and passes up through the Venturi passageway in the insert 8 and forms a radially expanding, cone-shaped jet as it discharges through the nozzle passageway 12 between the jet surface 11 and the opposing conical surfaces of the nozzle part 35. As mentioned, the width of this passageway may be adjusted as desired, a suitable adjustment being between 15 to 40 thousandths of an inch in one embodiment. As the steam comes in, it lifts the nozzle plug 35 from its seated position on the conical surface 11 and will maintain the nozzle plug 35 in the raised position against the bottom end of the regulating stem 50.

As the starch slurry leaves the sleeve-shaped or annular passageway 33, it is impinged or struck from the interior by the high velocity, conically shaped, radially expanding jet of steam and substantially all of the individual starch granules are instantaneously acted upon by the steam. Since all of the starch cells are well dispersed, particularly if the starch slurry is dilute, and since all of the starch granules are individually reached and acted upon or impacted by the steam to the same extent, it is possible to paste or cook starch to a very selective degree and with a very high degree of uniformity. Since the starch slurry passes through the cooker 5 in such a short time (i.e. a fraction of a second), and is then immediately discharged without holding, there is practically no retention time or opportunity for retrodegration in the cooker.

In Figs. 3 and 4, a modified continuous jet cooker and installation is shown which operates on generally the same basic principle as does the jet cooker and installation described above in connection with Figs. 1 and 2. Referring to Fig. 3, a continuous jet cooker device is indicated generally at 75 having a starch slurry inlet port 76, a cooked starch discharge port 77 and a steam inlet port 78. The construction of the cooker 75 will be described in detail in connection with Fig. 4.

The body 80 of the jet cooker is desirably a casting such as used for a conventional single seated valve. The casting 80 is partitioned on the interior into an upper chamber 81 communicating with the starch slurry inlet connection 76, and a bottom chamber 82 communicating with the cooked paste outlet or discharge connections 77. An integral partition or baffle 83 separates the chambers 81 and 82 and is provided with a central horizontal portion having a threaded valve port 84 which communicates between the two chambers. The casting or body 80 also has an interiorly threaded opening 85 at the top which corresponds to an interiorly threaded opening for the steam connection 78 at the bottom.

A hollow adapter plug or insert 86 is screwed into the connection 78, the vertical passage therethrough being in the form of three counter bores. The upper tubular portion 87 terminates in a conically shaped end, the central opening through which is indicated at 88 and the exterior or conical surface of which is indicated at 90.

The upper tubular portion 87 of the insert 86 cooperates with an insert 91 in the form of a tube, and a cap member designated at 92. It will be seen that the under or bottom surface of the cap member 92 is conically shaped and at an angle to conform to the taper and shape of the conical surface 90 so as to provide therebetween a conically shaped steam discharge passageway designated at 93.

The exterior side surface of the cap 92 is cylindrical so as to form an annular shaped passageway 94 in cooperation with the interior of the flow tube 91 extending upwardly above the baffle 83. Below the cap 92 the passageway between the exterior of the tubular extension 87 and the interior of the flow tube 91 is somewhat greater in width and is designated at 95.

The cap 92 is provided with a guide stem 96, preferably provided with a plurality of grooves as shown, and extends upwardly into a central opening provided therefor in a guide plug 97 which screws into the opening 85.

The stem 96 is engaged at the top by the lower end of an adjusting screw 98 which extends through an interiorly threaded boss 100 on the upper end of the plug 97. The top end of the screw 98 is provided with a head 101 adapted to be engaged by an inverted, cup-shaped clutch member 102 having an integrally formed drive shaft 103. It will be apparent that the screw 98 serves to position, i.e. limit, the upward movement, of the cap member 92 by reason of the engagement with the top end of the stem 96. The manner in which this adjustment is automatically effected will be further described below in connection with Fig. 3.

In view of the foregoing description of the manner in which the jet cooker 5 in Figs. 1 and 2 operates, the manner in which jet cooker 75 operates will be readily seen. Thus, starch slurry comes in through the connection 76 and into the upper chamber 81 from which it flows downwardly through the annular, sleeve-shaped passageway 94 in the form of a continuously flowing, thin film.

Steam flowing upwardly through the interior of the plug 86 discharges through the opening 88 and strikes against the bottom conical surface of the cap 92. The high velocity steam is thus deflected downwardly so as to expand radially at high velocity through the conically-shaped nozzle discharge opening 93. The high velocity steam thus impacts the thin annular stream of starch slurry from the interior so as to cook or process the starch granules to any desired degree in a fraction of a second. As described above in connection with the jet cooker 5 in Figs. 1 and 2, the heating of the starch slurry is substantially complete, uniform and instantaneous due to the symmetry of design and the extremely violent collision and resulting agitation of the steam jet and the flowing starch within the flow tube 91.

The cooked starch discharges through the annular passageway 95 into the bottom compartment or chamber 82 from which it flows out through the discharge connection 77.

It will be seen from the above description of the jet cooker 75 that it constitutes a very economical design in that it is composed of a standard body casting 80 with the other components being non-intricate parts which may be readily manufactured by conventional procedures and equipment at low cost.

For a description of the manner in which the jet cooker 75 may be automatically regulated to continuously cook or paste starch in an easily controlled and regulatable manner, reference may now be had to Fig. 3 and the installation shown therein.

Starch slurry is introduced into the inlet connections 76 from a line 105 connected with a suitable source. The automatic diluting and flow control system described and shown in co-pending application Serial No. 412,219 constitutes a preferred source of the starch slurry but any other suitable source may be used. Steam is introduced through the connection 78 from a steam line 106 provided with a strainer 107 a steam shut-off valve 108 and a steam pressure gauge 110.

The processed or pasted starch discharges from the connection 77 into a discharge line 111 provided with two T-fittings 112 and 113. The T-fitting 112 serves as a means for putting a surge chamber 114 into the discharge connection. The T-fitting 113 has a thermostat bulb 115 inserted in one of its connections and a cooked starch discharge line 116 is screwed into the other connection. The line 116 has a T-fitting 117 which is provided with an indicating thermometer 118.

The automatic control means for the continuous cooker 75 comprises a thermostat controller 120 and an electric motor operated steam control 121. The thermostat controller 120 is of known type, one commercially available form being manufactured by and obtainable from Minneapolis-Honeywell Company, of a type known as the Brown dual Electrovane recorder and controller, Model 3 Zone 602 Thermometer. A thermostat capillary tube 122 interconnects the thermostat bulb 115 with the controller 120.

The electric motor operated steam control 121 is also of known type and one suitable unit being manufactured by and obtainable from Barber Colman Company, being a reversible motor with reduction gears, known as its model PYZA 928 A–1–4500. It has an electric reversible motor for operating the drive shaft 103 in opposite directions depending upon the signal received from the controller 120. The controller 120 and the steam control 121 are electrically interconnected in known manner through the cable 122. The unit 121 is mounted by means of a bracket 123 on the top of the jet cooker 75.

In operation: When the temperature of the cooked starch slurry flowing through T 113 tends to drop below a predetermined set temperature, such a drop in temperature is sensed and transmitted to the controller 120 through the tube 122 which in turn activates the steam control 121 so as to rotate the shaft 103 in the direction which raises the screw 98, thereby permitting the cap member 92 to raise and allow more steam to pass through the nozzle. Conversely, if the temperature of the paste starch tends to rise in the T 113, this is also sensed by the bulb 115 and transmitted to the control 120 which in turn activates the steam control 121 so as to rotate the screw 98 in a reverse direction to lower the screw 98 and reduce the width of the nozzle opening.

Since certain changes and modifications may be made in the embodiments of the invention disclosed, and other embodiments may be made, without departing from the spirit and scope of the invention, all matter described above or shown in the drawings is intended to be interpreted as illustrative and not in a limiting sense.

What is claimed as new is:

1. A jet cooker for continuously pasting or cooking an aqueous slurry of starch comprising, a cooker body having a starch slurry inlet connection, a steam inlet connection, a cooked starch discharge connection and partitioned into two chambers with a port communicating therebetween, a sleeve-like member aligned with said port and providing the outer wall of an annular passageway for a tubular shaped stream of starch slurry, and steam nozzle means concentrically disposed within said sleeve-like member and also aligned with said port, said steam nozzle means comprising, a hollow steam inlet member terminating in an outlet opening surrounded by a generally frusto-conical nozzle surface, and a steam deflector member having a generally frusto-conical nozzle surface which mates with said first nozzle surface to define a generally frusto-conical steam discharge opening within said sleeve-like member, an outer surface of said steam nozzle means forming the inner wall of said annular passageway.

2. The jet cooker of claim 1 wherein said hollow steam inlet member and said steam deflector are relatively movable toward and away from each other whereby the width of said generally frusto-conical steam discharge opening is adjustable.

3. The jet cooker of claim 1 wherein said hollow steam inlet member is stationary and said steam deflector member is adjustable toward and away from said inlet member whereby the width of said generally frusto-conical steam discharge opening is adjustable.

4. A continuous steam jet cooker for starch and similar amylaceous material, comprising, a cooker body having an inner partition dividing the interior into an upper chamber and a lower chamber, said cooker body having on opposite sides thereof a starch slurry inlet into said upper chamber and a steam inlet into said lower chamber, said partition having a horizontal central portion which supports a Venturi member having a Venturi passage for passage of steam from said lower chamber therethrough, a stationary nozzle member projecting down into said upper chamber from an opening in the top of said valve body with the lower end of said nozzle member surrounding the upper end of said Venturi member so as to define therewith a narrow annular-shaped passageway communicating between said upper chamber of the cooker body and the interior of said stationary nozzle member, and a nozzle plug member disposed in the upper section of said Venturi passage so as to define therewith a narrow conical steam outlet passage the outer end of which at least approximately intersects the upper end of said narrow annular-shaped passageway.

5. The starch cooker of claim 4 wherein said valve body corresponds to the body of a globe type valve.

6. A continuous steam jet cooker for starch and similar amylaceous material, comprising, a cooker body in the form of a globe valve-type body, a Venturi insert member disposed in the valve port, a tapered sleeve-shaped stationary nozzle member having its larger upper end supported on the rim of the top opening into said body and the smaller bottom end projected down into the upper compartment of said valve body and surrounding the upper end of said Venturi insert member so as to define therewith a narrow annular-shaped passage through which starch slurry flows from said upper chamber into the interior of said stationary nozzle member, a nozzle plug member disposed in the upper section of the Venturi opening through said Venturi insert with the bottom surface of said nozzle plug being conical so as to match said upper section of the Venturi opening, said nozzle plug member having a depending stem which projects down through said Venturi opening and into the lower chamber of said cooker body, a guide post for said depending stem projecting up from the bottom of said valve body and having an opening in the upper end thereof into which said stem slidably projects, a cooker outlet fitting mounted on the top of said cooker body and having a laterally projecting section with a pasted starch slurry outlet opening therein, and a nozzle-opening adjusting means comprising a rod one portion of which projects down through said cooker outlet fitting in coaxial alignment with said nozzle plug member and another portion of which projects out of said fitting, and support means for said rod whereby the level of the bottom end may be adjusted so as to limit the upward lifting of said nozzle plug by steam in the lower compartment of said cooker body thereby determining the width of the conical steam jet opening which at least approximately intersects the upper end of said annular-shaped passageway.

7. A continuous type steam jet cooker for starch and similar amylaceous material, comprising, a cooker body generally in the form of the body of a globe type valve and having four port openings at the top and bottom and on opposite sides, and wherein the interior of the valve body is partitioned into upper and lower chambers by a baffle having a central horizontal portion provided with a valve portion communicating between the chambers, a vertical flow tube supported by said central horizontal baffle portion and passing through said valve portion therein, a steam inlet insert projecting through the bottom opening of said valve body with the steam discharge end of said steam inlet projecting coaxially up into said flow tube, the top surface of the discharge end of said steam inlet insert having a frusto-conical shape, a centrally apertured insert member in the top opening of said valve body, a nozzle cap having a conically-shaped recess in the underside thereof corresponding in slope to the slope of said frusto-conical surface, support means attached to said nozzle cap and projecting upwardly into said centrally apertured insert for supporting said nozzle cap in coaxial alignment with said stream inlet insert, and means for adjustably spacing the discharge end of said steam inlet insert and said nozzle cap relative to each other whereby a conically-shaped steam outlet opening of adjustable width is formed between said frusto-conical surface of said steam inlet insert and the surface of said conical recess in said nozzle cap.

8. Apparatus for continuously pasting or cooking an aqueous slurry of starch in an automatically regulated manner comprising, in combination, a jet cooker of the type wherein a stream of starch slurry is acted on by a jet of steam to form stream of pasted starch, conduit means for delivering an aqueous slurry of starch into said jet cooker, conduit means for delivering steam into said jet cooker, conduit means for removing pasted starch from said cooker, flow control means for regulating the flow of steam, and thermostat control means having a sensing element disposed in the flow path of the pasted starch and a temperature actuated member operatively connected with said steam flow control means.

9. Apparatus for continuously pasting or cooking an aqueous slurry of starch in an automatically regulated manner comprising, in combination, a jet cooker of the type wherein a stream of starch slurry is acted on by a jet of steam to form stream of pasted starch and having adjustable flow control means therein for regulating the flow of steam, conduit means for delivering an aqueous slurry of starch into said jet cooker, conduit means for delivering steam into said jet cooker, conduit means for removing pasted starch from said jet cooker, and thermostat control means for said jet cooker comprising a temperature sensing element disposed in said conduit means for removing pasted starch, a thermostat controller interconnected with said sensing element, and motor means operatively interconnected with said thermostat controller for control thereby and operatively interconnected with said adjustable flow control means for adjusting the same in response to the discharge temperature of the slurry of pasted starch.

References Cited in the file of this patent

UNITED STATES PATENTS

| | | |
|---|---|---|
| 1,452,265 | Collins | Apr. 17, 1923 |
| 1,977,171 | Clithero | Oct. 16, 1934 |
| 2,805,966 | Etheridge | Sept. 10, 1957 |

OTHER REFERENCES

Paper Trade Jour., Art. by Ethridge, November 5, 1954, pp. 16–18.